July 19, 1955 H. T. WHITE 2,713,311

MOTOR DRIVEN PUMP

Filed Dec. 6, 1949

Inventor
HOWARD T. WHITE

B. T. Wolvensmith
Attorney

United States Patent Office 2,713,311
Patented July 19, 1955

2,713,311

MOTOR DRIVEN PUMP

Howard T. White, Philadelphia, Pa.

Application December 6, 1949, Serial No. 131,386

4 Claims. (Cl. 103—87)

This invention relates to motor driven pumps.

It is the principal object of the present invention to provide a motor driven pump having an improved character of rotor mounting.

It is a further object of the present invention to provide a motor driven pump having improved provisions for sealing the motor stator and the chamber within which it is located, and the rotor chamber.

It is a further object of the present invention to provide a motor driven pump which will be simple in construction, which may be readily assembled, and in which the thrust bearing is accommodated in an improved manner.

It is a further object of the present invention to provied a motor driven pump in which the size or type of pump impeller is not limited by the size of the motor.

It is a further object of the present invention to provide a motor driven pump which eliminates problems of alinement between the motor rotor and the pump impeller.

It is a further object of the present invention to provide a motor driven pump capable of handling various kinds of liquids, including those carrying solids, and which does not require lubrication.

It is a further object of the present invention to provide a motor driven pump which may be run submerged and which does not require stuffing boxes or glands.

Other objects and advantageous features of the invention will be apparent from the specification and claims.

Figure 1:
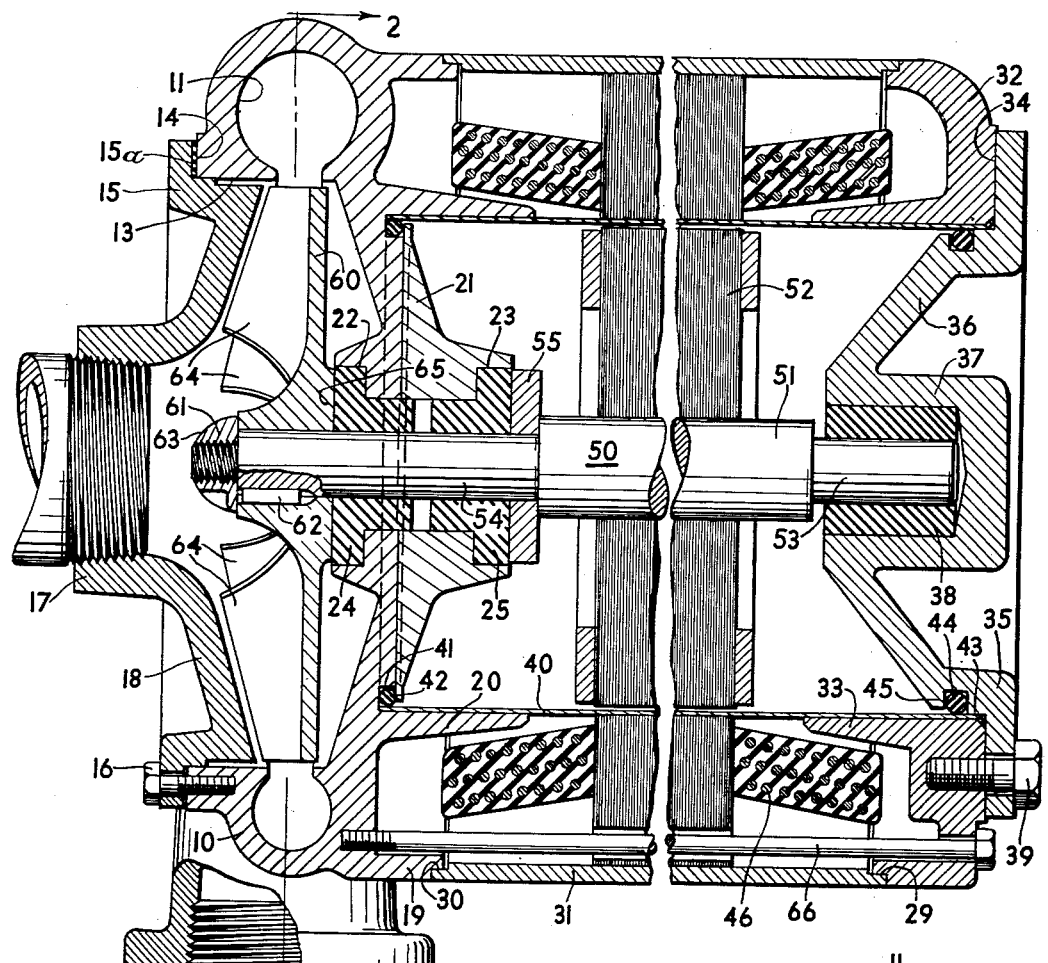
Figure 2:
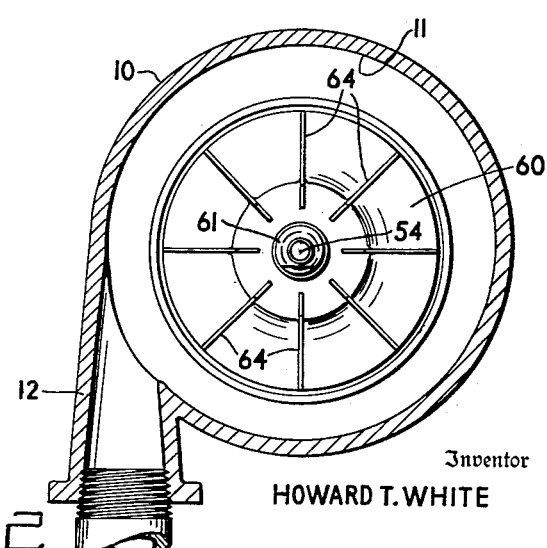

The nature and characteristic features of the invention will be more readily understood from the following description, taken in connection with the accompanying drawings forming part hereof, in which:

Fig. 1 is a longitudinal central sectional view of a motor driven pump in accordance with the invention; and Fig. 2 is a transverse sectional view taken approximately on the line 2—2 of Fig. 1.

Referring now more particularly to the drawings, an impeller housing 10 is provided, preferably having a scroll 11 formed therein in communication with a tangentially disposed fluid delivery connection 12. The housing 10, at its outer end, is provided with an inner circumferentially disposed cylindrical face 13 and an outer annular face 14 for the reception of a cover plate 15. The cover plate 15 is adapted to be held in position on the housing 10 by suitable studs 16, a sealing gasket 15a being interposed between the face 13 and the plate 15. The plate 15, at the central portion thereof, is provided with a fluid inlet 17, from which an outwardly flaring section 18 extends which serves as a shroud.

The housing 10, on the opposite side thereof from that on which the cover plate 13 is mounted, has an outer circumferentially disposed rim portion 19 and an inner flange portion 20 concentric with the rim portion 19. Extending inwardly from the flange portion 20, a frusto-conical partition 21 is provided, the innermost portion of which is provided with grooves 22 and 23 for the reception of bearing members 24 and 25. The bearing members 24 and 25 may be of any suitable material, preferably fluid lubricated, such as rubber, wood, and the like, in accordance with the fluid handled in the pump.

The rim 19 is provided with a groove 30 in which one end of a cylindrical cover 31 is seated, the other end of the cover 31 being seated in a groove 29 in an annular end casing 32. The end casing 32 is also provided with a flange 33, similar to the flange 20, and has an outer annular face 34 against which an end closure plate 35 is adapted to engage. The end closure plate 35 has an integral inwardly extending partition 36 provided with an internally bored boss 37 which serves as a seat for a bearing 38. The end closure plate 35 is adapted to be held in assembled relation with respect to the annular casing 32 by means of studs 39.

A hollow sealing cylinder 40 of non-magnetic material is provided which extends along the interior of the flange 20 and into a groove 41 within which a sealing ring 42, of rubber, natural or synthetic, and of the type known as an O-ring, is disposed. The opposite end of the sealing cylinder 40 extends in a space between the inner face of the flange 33 and a shoulder 43 on the closure plate 35. The shoulder 43 is provided with a recess 44 in which a sealing ring 45, similar to the sealing ring 42, is mounted.

Within the space enclosed between the cover 31, the cylinder 40, the housing 10, and the annular housing 32, a space is provided within which the stator and windings 46 of an induction motor are mounted and sealed in fluid tight condition.

A rotor 50 is provided having a shaft 51 on the central portion of which the rotor 52 of the induction motor is secured. The shaft 51 has an end portion 53 extending into and journaled in the bearing 38 and has an oppositely disposed portion 54 of reduced diameter extending through and journaled in the bearing members 24 and 25. A thrust collar 55 may be provided on the shaft 51 and at the shoulder at the inner end of the shaft portion 54 for engagement with the transverse face of the bearing 25. The shaft 51, at the outer or free end thereof, has a pump impeller 60 mounted thereon and secured thereto by means of a nut 61. A key 62 may also be provided for holding the impeller 60 in fixed relation to the shaft 51. The outer faces of the nut 61 and the end of the shaft portion 54 are preferably curved, as at 63, for directing fluid towards impeller blades 64 radially disposed on the impeller 60.

The impeller 60 has an annular thrust ring 65 formed integral therewith for engagement with the transverse face of the bearing 24.

The impeller housing 10, annular end casing 32, and cover 31, are held in assembled relation by one or more studs 66 which extend axially.

It will be noted that access to the impeller 60 may be readily had by removal of the studs 16 which permits withdrawal of the cover plate 15 and inspection or removal of the impeller 60.

Upon removal of the impeller 60, the remaining portions of the rotor may be readily removed after removal of the studs 39 and the end closure plate 35.

In use, the stator chamber is maintained and sealed in fluid tight condition by the rings 42 and 45 and the cylinder 40 which prevent the passage of any fluid advancing past the bearings 24 and 25.

The use of fluid lubricated bearings 24, 25 and 38 obviates the necessity for separate lubrication.

In the event that the pump is to be run submerged, the joints between the ends of the cover 31 and the grooves 29 and 30 may be made fluid tight by proper machining.

If the pump is employed for liquid containing solids, the solids will be prevented from entering the rotor chamber by the clearance in the bearings 24 and 25.

I claim:

1. In a motor driven pump, an impeller housing having an end opening and a fluid delivery connection, a removable end closure for said impeller housing end opening, an annular end housing axially spaced from said impeller housing and having an outer central end opening, a cover extending between said housings, a hollow cylinder of non-magnetic material extending between said housings and spaced inwardly from said cover to provide a motor stator chamber between said cylinder and said cover, the interior space in said cylinder providing a motor rotor chamber, one end of said cylinder extending to said central end opening, said impeller housing having a transversely extending partition member at one end of the motor rotor chamber, a second removable end closure carried by said end housing for closing the other end of the motor rotor chamber and having an axially extending cylindrical portion in engagement with the interior of said cylinder at the other end of said motor rotor chamber, thrust and journal bearings carried by said partition member, a rotor engaging said bearings having a separable fluid impeller mounted in said impeller housing insertable through said impeller housing end opening and a motor rotor in said motor rotor chamber insertable through said end housing end opening, and a bearing member for said rotor carried by said second end closure.

2. In a motor driven pump, an impeller housing having an end opening and a fluid delivery connection, a removable end closure for said impeller housing end opening, an annular end housing axially spaced from said impeller housing and having an outer central end opening, a cover extending between said housings, a hollow cylinder of non-magnetic material extending between said housings and spaced inwardly from said cover to provide a motor stator chamber between said cylinder and said cover, the interior space in said cylinder providing a motor rotor chamber, one end of said cylinder extending to said central end opening, said impeller housing having a transversely extending partition member at one end of the motor rotor chamber, a second removable end closure carried by said end housing for closing the other end of the motor rotor chamber and having an axially extending cylindrical portion in engagement with the interior of said cylinder at the other end of the motor rotor chamber, a rotor journaled in said partition member having a fluid impeller mounted in said impeller housing and a motor rotor in said motor rotor chamber, and a sealing ring mounted in said cylindrical portion and in engagement with the interior of said cylinder.

3. In a motor driven pump, an impeller housing having a fluid delivery connection, a removable end closure for said impeller housing having a fluid inlet connection, an annular end housing axially spaced from said impeller housing and having an outer central end opening, a cover extending between said housings, a hollow cylinder of non-magnetic material extending between said housings and spaced inwardly from said cover to provide a motor stator chamber between said cylinder and said cover, the interior space in said cylinder providing a motor rotor chamber, one end of said cylinder extending to said central end opening, said impeller housing having a transversely extending partition member at one end of the motor rotor chamber, a second removable end closure carried by said end housing for closing the other end of the motor rotor chamber and having an axially extending cylindrical portion in engagement with the interior of said cylinder at said other end of said motor rotor chamber, a rotor journaled in said partition member having a fluid impeller mounted in said impeller housing and a motor rotor in said rotor chamber, said motor rotor being insertable through said end housing outer end opening, and a bearing member for said rotor carried by said second end closure.

4. In a motor driven pump, an impeller housing having an end opening and a fluid delivery connection, a removable end closure for said impeller housing end opening, an annular end housing axially spaced from said impeller housing and having an outer central end opening, a cover extending between said housings, a hollow cylinder of non-magnetic material extending between said housings and spaced inwardly from said cover to provide a motor stator chamber between said cylinder and said cover, the interior space in said cylinder providing a motor rotor chamber, one end of said cylinder extending to said central end opening, said impeller housing having a transversely extending partition member at one end of the motor rotor chamber, a second removable end closure carried by said end housing for closing the other end of the motor rotor chamber and having an axially extending cylindrical portion in engagement with the interior of said cylinder at the other end of the motor rotor chamber, a rotor journaled in said partition member having a fluid impeller mounted in said impeller housing and a motor rotor chamber, sealing rings for the ends of said cylinder including a sealing ring mounted in said partition wall in engagement with the interior of said cylinder and a sealing ring mounted in said cylindrical portion and in engagement with the interior of said cylinder.

References Cited in the file of this patent

UNITED STATES PATENTS

| | | |
|---|---|---|
| 2,301,063 | McConaghy | Nov. 3, 1942 |
| 2,406,947 | Harlamoff | Sept. 3, 1946 |
| 2,478,706 | Peters | Aug. 9, 1949 |
| 2,517,233 | Peters | Aug. 1, 1950 |
| 2,520,880 | Harlamoff | Aug. 29, 1950 |
| 2,524,269 | Patterson | Oct. 3, 1950 |

FOREIGN PATENTS

| | | |
|---|---|---|
| 139,277 | Great Britain | Mar. 4, 1920 |
| 141,467 | Great Britain | Apr. 22, 1920 |